United States Patent Office 3,146,843
Patented Sept. 1, 1964

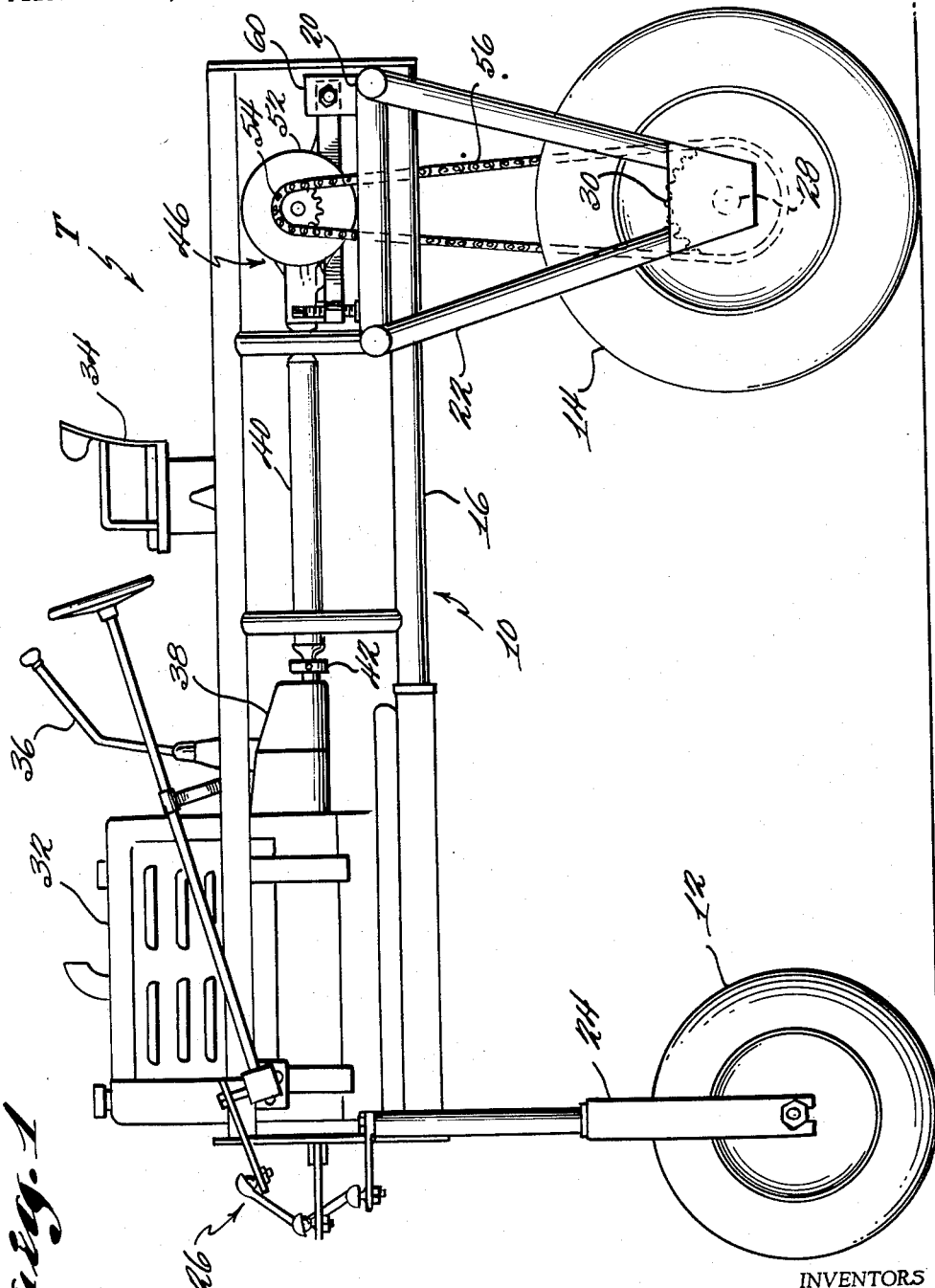

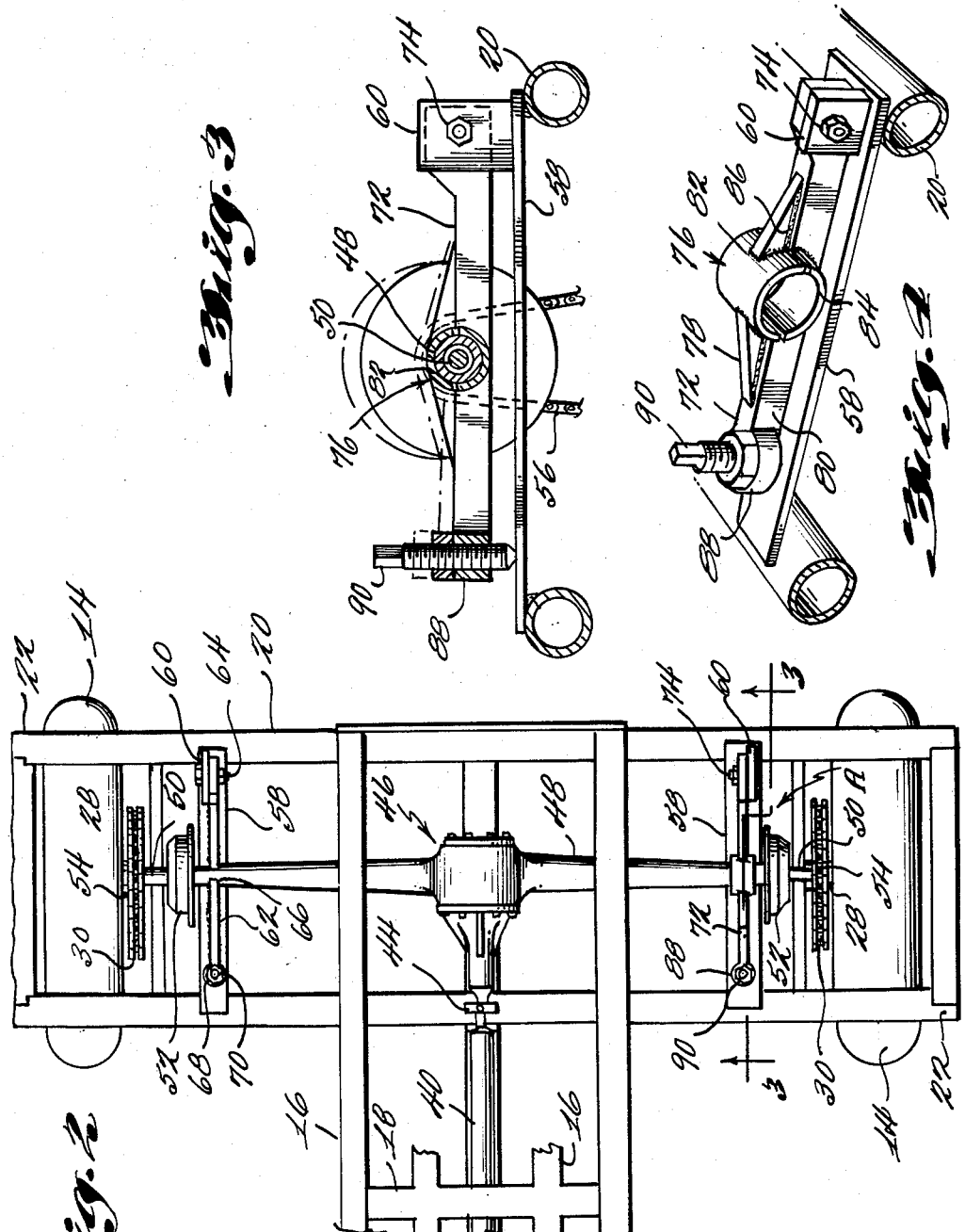

3,146,843
HIGH CLEARANCE VEHICLE
Francis M. Hinson, Rte. 3, and Bryant H. Harrill,
406 Dogwood Ave., both of Bennettsville, S.C.
Filed Jan. 10, 1963, Ser. No. 250,691
2 Claims. (Cl. 180—75)

The present invention relates to vehicles in which the tractive power to the running gear is provided by a sprocket and chain drive and more particularly to vehicles of the type having high clearance with the ground, thus necessitating a sprocket and chain drive operatively connected to a source of power carried on the vehicle frame and extending downwardly to the running gear such as traction wheels.

While the vehicle disclosed in the drawings and described in the specification is a four wheel vehicle, it is, of course, within the scope of the present invention that the drive mechanism could be applied to three wheel vehicles such as the tricycle type of tractor. Also, the running gear has been disclosed as traction wheels but the arrangement of sprocket and chain drive is applicable to those vehicles having running gears such as traction crawler units or tank treads.

High clearance vehicles are especially adapted for farm use when such vehicles are provided with spraying equipment for spraying insecticides, fertilizers and the like on rows of plants. The vehicle must have sufficient clearance between the frame and the ground in order that the growing plants are not disturbed as the vehicle is guided down the rows of plants with the wheels positioned intermediate the rows of plants. Another use for high clearance vehicles such as disclosed in the drawings is as a hauling vehicle for hauling timber or lumber suspended beneath the same. In all high clearance vehicles, the problem exists in driving the running gear such as the traction wheels from the source of power positioned on the main vehicle frame high above the traction or driving wheels. The conventional sprocket and chain drive has been found most advantageous for use in these types of vehicles but because the vehicles are subjected to rough usage, a problem was created in that the drive chains would, from time to time, require a tension adjustment. Improper chain tension results in a tendency for the chains to jump the sprockets or climb the sprockets and in either event, the damage caused is costly to the drive for the vehicle.

Heretofore, efforts have been made to provide an adjustment for the chain tension of the chains but such previous efforts have not been entirely successful as no provision was made to adjust tension of the chains on one side of the vehicle independently of the chains on the other side of the vehicle. Consequently, the previous adjustment arrangements did not provide an accurate chain tension adjustment for both chains but rather provided an adjustment which was merely a compromising adjustment between the two chains. In other words, the single adjustment oftentimes resulted in the chain tension of one chain being too tight while the tension of the other chain was not tight enough. If the chain which was too tight was loosened, the tension was relaxed even more on the other chain. The converse of the above was also true in that if the tension was increased on the chain which was too loose, the tension on the other chain became too great.

In view of the above, an important object of the present invention is to provide means by which chain tension on the two drive chains on opposite sides of a vehicle may be adjusted for tension independently and individually of each other.

A further object of the present invention is to provide a vehicle with an improved sprocket and chain drive which may provide adjustment of chain tension on either of the chains without putting the vehicle out of use for any substantial period of time.

A still further object of the present invention is to provide a high clearance vehicle having a chain and sprocket drive for each of its traction wheels, the chain and sprocket drive being provided with an individual and independent adjustment for each chain on opposite sides of the vehicle which does not require complicated mechanism but may be incorporated on such vehicles at a minimum of expense and in a minimum of time.

Still another object of the present invention is to provide an improved arrangement for individually and independently adjusting the tension of the chains of the traction wheel drives of a high clearance vehicle which adjustment may be accomplished in the field without bringing the vehicle into the shop and without the necessity of jacking the vehicle.

These and other objects and advantages of the present invention will appear more fully in the following specification, claims and drawings in which:

FIGURE 1 is a side elevational view of a four wheel tractor type vehicle incorporating the chain tensioning adjustment of the present invention;

FIGURE 2 is a top plan view of a portion of the main frame of the vehicle of FIGURE 1 and illustrating the adjusting means in the present invention in more detail;

FIGURE 3 is a sectional view taken on the line 3—3 of FIGURE 2, the broken line representing movement of the differential housing by the adjustment means to increase the chain tension;

FIGURE 4 is a fragmentary perspective view illustrating the bracket for the adjustment means on one side of the vehicle, the view being taken looking in the direction of the arrow A of FIGURE 2.

Referring now to the drawings wherein like character and reference numerals represent like or similar parts, the high clearance vehicle is illustrated as a tractor T having a horizontally disposed main frame generally designated at 10, the main frame being supported high off the ground by a pair of steering wheels 12 and a pair of traction or drive wheels 14. In more detail, the generally horizontally disposed main frame 10 includes longitudinally extending tubular frame members 16 having suitable cross members 18 welded thereto to form a rigid unit. At the rear end of the vehicle, looking to the right of FIGURE 1 and at FIGURE 2, the main frame 10 is provided with an integral transversely extending horizontally disposed sub-frame 20 which has welded thereto adjacent its outer ends, the downwardly extending struts 22 for supporting wheels 14. The forward portion of the vehicle is provided with a pair of downwardly extending struts 24 for supporting the steering wheels 12, the struts being on a movable frame structure so mounted that the steering wheels may be controlled through the steering mechanism generally indicated at 26. Any suitable type of steering mechanism 26 may be utilized.

Struts 22 which are transversely spaced from each other support the traction wheels 14 at their lower end by means of stub axles 28. A sprocket 30 is keyed to each of the stub axles 28 and, thus, is operatively connected to the traction wheels 14. The sprockets 30 will be hereinafter referred to in the specification and claims as the driven sprockets.

Main frame 10 supports the usual power plant 32 such as an internal combustion engine at its forward end. Also, the frame 10 carries an operator's seat 34 as well as the conventional gear shift 36 for the usual transmission 38. The drive shaft or torque tube 40 is connected to the output of the transmission 38 by means of a universal coupling 42, the other end of the drive shaft 40 being connected by a universal coupling 44 (FIGURE 2) to the input of a drive mechanism generally indicated at 46. In more detail, the drive mechanism 46 is a standard differential unit provided with an elongated transversely extending housing 48 having the usual differential axles 50 extending from the differential mechanism of the unit through the housing and out of the ends of the housing. Brake drums 52 of conventional type are provided for braking the rotation of axles 50. On the outer ends of each of the differential axles 50, there is provided a drive sprocket 54. A chain 56 is entrained about each drive sprocket 54 and the respective driven sprocket 30 positioned therebeneath. As is now apparent, the rotation of the drive sprockets 54 by the differential mechanism of the drive mechanism 46 transfers power through the chains 56 to the respective traction wheels 14.

The drive mechanism 46 is supported on the transversely extending frame 20 of main frame 10 in such a manner that the positions of the oppositely disposed drive sprockets 54 may be independently and individually adjusted relative to the positions of their respective driven sprockets 30. In more detail, the transverse frame 20 is provided with integral cross members 58 which extend beneath the respective outer ends of the differential housing 48. An upstanding lug 60 is welded to each of the cross members 58 as best shown in FIGURES 2 and 3.

As shown in the upper portion of the FIGURE 2, a bracket arm 62 is pivotally connected to the lug 60 on an axis of a bolt 64, which extends transverse to the longitudinal axis of the vehicle. The outer end of the housing 48 is welded to and intermediate of the ends of the bracket arm 62 as indicated at 66. At outer free end of the bracket arm 62, there is provided an enlarged portion 68 which threadedly receives a jack screw 70. The lower end of jack screw 70 bears on the cross member 58 which extends beneath the bracket arm 62. By threading the jack screw 70 inwardly or outwardly, the relative position of the sprocket 54 can be changed to tighten or loosen the chain 30 entrained about the sprockets 54 and 30 which are uppermost in FIGURE 2. It will now be apparent that the sprocket 54 is rocking about the axis of the bolt 64 when the bracket arm 62 is pivoted about the same.

Referring now to the lower portion of FIGURE 2, a bracket 72 is pivotally connected to lug 60 of the lowermost cross member 58 by a bolt 74. It will be noted that the bolt 74 has an axis which is coincident with the axis of the bolt 64 so that both brackets 72 and 62 respectively effectively pivot on a common axis transverse to the longitudinal axis of the vehicle. Bracket 72, as best shown in FIGURES 2, 3 and 4, is provided with a collar or sleeve 76, which unlike bracket 62 loosely fits around the outer or lower end of the differential housing as viewed in FIGURE 2 and supports the same relative to the main frame 10.

In order that the bracket 72 may be easily assembled on the outer end of the housing 48 without removal of the brake drum 52, the bracket 72 is made in two parts 78 and 80, the parts having mating sleeves 82 and 84 for forming the collar 76. With the lower part 80 positioned with the outer end of the housing 48 resting in the semicircular sleeve 84, the upper part is then placed over the housing and is welded as indicate at 86. Thus, it will now be obvious that the bracket 72 has a loose fit on the housing 48 and can be slightly rocked relative to the housing and pivoted about the transverse axis of the housing. Bracket 72 is provided on its outer end with an enlarged portion 88 (FIGURES 3 and 4) which is adapted to threadedly receive a jack screw 90 similar to the jack screw 70. The lower end of jack screw 90 bears directly on the member 58 immediately therebeneath.

The operation of the invention will be readily understood by reference to FIGURES 2 and 3. When it is desired to adjust the tension of the chain 56 for the uppermost wheel shown in FIGURE 2, the jack screw 70 is threaded in or out and will cause the bracket 58 to pivot one way or the other about the transverse axis through bolt 64. This causes the respective ends of the differential housing 48 to be lifted or lowered as desired without appreciably affecting the relative position of the drive sprocket 54 at the opposite end of the housing as the bracket 72 does not move and the end of the housing 48 supported thereby can rotate within the collar 76. On the other hand, when it is desired to adjust the tension of the chain 56 for the lower drive sprocket 54 as viewed in FIGURE 2 and driven sprocket 30 therebeneath, the jack screw 90 is threaded in the desired direction and while the bracket 72 pivots about the bolt 74, it also will rotate or rock about the axis of the extending differential housing 48 and will lift or lower the respective end of such housing as desired without appreciably affecting movement of the opposite end of the same. This will be evident since the bracket 58 is welded to the other end of the differential housing 48 and does not move.

It is thus seen that the objects and advantages of the present invention have been fully and effectively accomplished in the vehicle described and illustrated in the drawings. However, the present invention is susceptible to some modifications without departing from the spirit and principle thereof.

Therefore, the terminology used in this specification and the illustrations used in the drawings are for the purpose of description and not limitation, the scope of the invention being defined in the claims.

What is claimed is:

1. In a high clearance vehicle having steering wheel means and a pair of transversely spaced traction wheels, the combination comprising: a horizontally disposed main frame; a pair of transversely spaced downwardly extending struts connected to said main frame and supporting the traction wheels at the lower end thereof respectively; a pair of drive sprockets operatively connected to the traction wheels respectively; a source of power carried by said main frame; a drive mechanism operatively connected to said source of power and including an outer elongated transveresly extending housing, a pair of drive sprockets at opposite ends of said housing, and a pair of chains, one of said chains connecting one drive sprocket with one driven sprocket and the other of said chains connecting the other drive sprocket with the other driven sprocket; transversely spaced brackets pivotally connected to said main frame on a horizontally disposed axis transverse to the longitudinal axis of the main frame, one of said brackets being rigidly connected to said housing adjacent one of its ends for supporting the same, the other of said brackets having a collar thereon loosely fitting around said housing adjacent its other end for supporting the same; and a pair of adjustment screws threadedly received in said brackets and each having one end bearing upon said main frame.

2. In a vehicle having a steering wheel means and a pair of transversely spaced traction wheels, the combination comprising: a horizontally disposed main frame from which the traction wheels are rotatably supported; a pair of driven sprockets operatively connected to the traction wheels respectively; a source of power; a differential unit operatively connected to said source of power and including an elongated transversely extending differential housing and a pair of drive sprockets carried at the opposite ends of said housing; a pair of chains, one of said chains being entrained about one drive sprocket and one driven sprocket and the other of said chains being entrained about the other drive sprocket and the other driven sprocket; transversely spaced brackets hingedly connected to said main frame on a horizontally disposed axis parallel to and spaced from the axis of said differential housing, one of said brackets being rigidly connected to said differential housing adjacent one of its ends, the other of said brackets having a collar thereon loosely fitting about said differential housing adjacent its other end for supporting the same; and a pair of adjustment screws threadedly received in said brackets and each having one end bearing upon said main frame, said adjustment screws being threadedly received in the respective brackets adjacent the ends thereof opposite the ends hingedly connected to the main frame with the differential housing being supported by the brackets intermediate the adjustment screws and the ends hingedly connected to the main frame.

References Cited in the file of this patent

UNITED STATES PATENTS

| | | |
|---|---|---|
| D. 146,559 | Dimick | Apr. 8, 1947 |
| 1,209,209 | Ross | Dec. 19, 1916 |
| 1,245,680 | Chase | Nov. 6, 1917 |
| 1,269,034 | Woodworth | June 11, 1918 |
| 2,409,526 | Ausherman | Oct. 15, 1946 |